United States Patent
Giles-Brown et al.

(10) Patent No.: US 8,875,817 B2
(45) Date of Patent: Nov. 4, 2014

(54) HITCH ASSEMBLY FOR ARTICULATED MOBILE MACHINE

(71) Applicant: Caterpillar S.A.R.L., Geneva (CH)

(72) Inventors: Iain J. Giles-Brown, Tyne & Wear (GB); Ian H. Mearns, Sunderland (GB); Terence Fairless, County Durham (GB)

(73) Assignee: Caterpillar SARL, Geneva (CH)

( * ) Notice: Subject to any disclaimer, the term of this patent is extended or adjusted under 35 U.S.C. 154(b) by 151 days.

(21) Appl. No.: 13/690,846

(22) Filed: Nov. 30, 2012

(65) Prior Publication Data

US 2014/0151137 A1  Jun. 5, 2014

(51) Int. Cl.
*B62D 53/00* (2006.01)
*B60D 1/01* (2006.01)
*F16B 21/00* (2006.01)
*B62D 53/02* (2006.01)

(52) U.S. Cl.
CPC . *B60D 1/01* (2013.01); *F16B 21/00* (2013.01); *B62D 53/026* (2013.01)
USPC ....................................... 180/14.4

(58) Field of Classification Search
CPC ....................................... B60D 1/01
USPC ........... 180/14.1, 14.2; 403/315, 320; 411/90, 411/91, 92

See application file for complete search history.

(56) References Cited

U.S. PATENT DOCUMENTS 2,877,024 A  3/1959  Storatz
6,533,061 B1  3/2003  Fairless et al.

FOREIGN PATENT DOCUMENTS

FR  1 281 099  1/1962
GB  1 427 194  3/1976

*Primary Examiner* — Joseph M Rocca
*Assistant Examiner* — Gabriela C Craciun
(74) *Attorney, Agent, or Firm* — Finnegan, Henderson, Farabow, Garrett & Dunner LLP

(57) ABSTRACT

A hitch assembly is disclosed for use with an articulated mobile machine. The hitch assembly may have a yoke portion, a tube portion, a driveshaft, and a hitch carrier to rotationally support the driveshaft inside the tube portion and having a plurality of first holes. The hitch assembly may further have a plurality of fasteners to connect the hitch carrier to the tube portion via the plurality of first holes, and a thrust collar to threadingly engage a periphery of the hitch carrier and having a plurality of second holes. The hitch assembly may additionally have a locking plate with at least one pin to engage at least one of the plurality of second holes, and a plurality of third holes to receive at least some of the plurality of fasteners. The number of the plurality of second holes is greater than the number of the plurality of first holes.

18 Claims, 3 Drawing Sheets

HITCH ASSEMBLY FOR ARTICULATED MOBILE MACHINE

TECHNICAL FIELD

The present disclosure relates generally to a hitch assembly and, more particularly, to a hitch assembly for an articulated mobile machine.

BACKGROUND

Articulated mobile machines, for example haul trucks, scrapers, wheel loaders, motor graders, and other machines, generally include a front tractor section and a rear trailer section that are coupled together by way of a hitch. A conventional hitch is configured to articulate and allow the front tractor section to pivot about the hitch in a direction different from the rear trailer section. This articulation facilitates steering of the machine.

Some articulated hitches are also configured to allow the rear trailer section to transversely rotate somewhat relative to the front tractor section to help keep all wheels of the machine grounded during travel over rough terrain. An exemplary hitch of this type is disclosed in U.S. Pat. No. 6,533,061 that issued to Fairless et al. on Mar. 18, 2003 ("the '061 patent").

The hitch of '061 patent includes a cylindrical portion that is trunion-mounted within a yoke-shaped bracket. A tube member is bolted to an end of the cylindrical portion and extends in a direction opposite the yoke-shaped bracket. The yoke-shaped bracket is pivotally connected to the front tractor section of a mobile machine, while the tube member is slidingly received within the rear trailer section of the mobile machine. A flange threadingly engages the end of a driveshaft assembly, which passes through a center of the tube member. The end of the driveshaft assembly is connected to an end of the tube member. In this configuration, the flange positions the driveshaft assembly within the tube member and connects the tube member to the rear trailer section of the mobile machine.

Although adequate for most applications, the hitch of the '061 patent can wear over time. The wear can cause the hitch joint to become loose, providing opportunities for excessive vibration and shock loading during stops and starts of the mobile machine. In order to accommodate this wear, the flange is adjustable relative to the end of the driveshaft. However, the adjustment typically used in connection with the hitch of the '061 patent may lack precision, be difficult to make, and not be robust in new machines with higher loadings.

The disclosed hitch assembly is directed to overcoming one or more of the problems set forth above and/or other problems of the prior art.

SUMMARY

In one aspect, the present disclosure is directed to a hitch assembly. The hitch assembly may include a yoke portion, a tube portion extending from the yoke portion, a driveshaft, and a hitch carrier located at a first end of the tube portion opposite the yoke portion and configured to rotationally support the driveshaft inside the tube portion. The hitch carrier may have a plurality of first holes. The hitch assembly may further include a plurality of fasteners configured to connect the hitch carrier to the first end of the tube portion via the plurality of first holes, and a thrust collar located at the first end of the tube portion. The thrust collar may be configured to threadingly engage an outer periphery of the hitch carrier and may have a plurality of second holes. The hitch assembly may additionally include a locking plate having at least one pin configured to engage at least one of the plurality of second holes, and a plurality of third holes configured to receive at least some of the plurality of fasteners. A number of the plurality of second holes may be greater than a number of the plurality of first holes.

In another aspect, the present disclosure is directed to a locking plate for a hitch assembly. The locking plate may include a generally triangular base plate, and a plurality of holes formed at a base edge of the base plate. The locking plate may further include a single hole formed at a tip of the base plate opposite the base edge, and at least one tool engagement feature located radially between the plurality of holes and the single hole.

DETAILED DESCRIPTION

Figure 1:
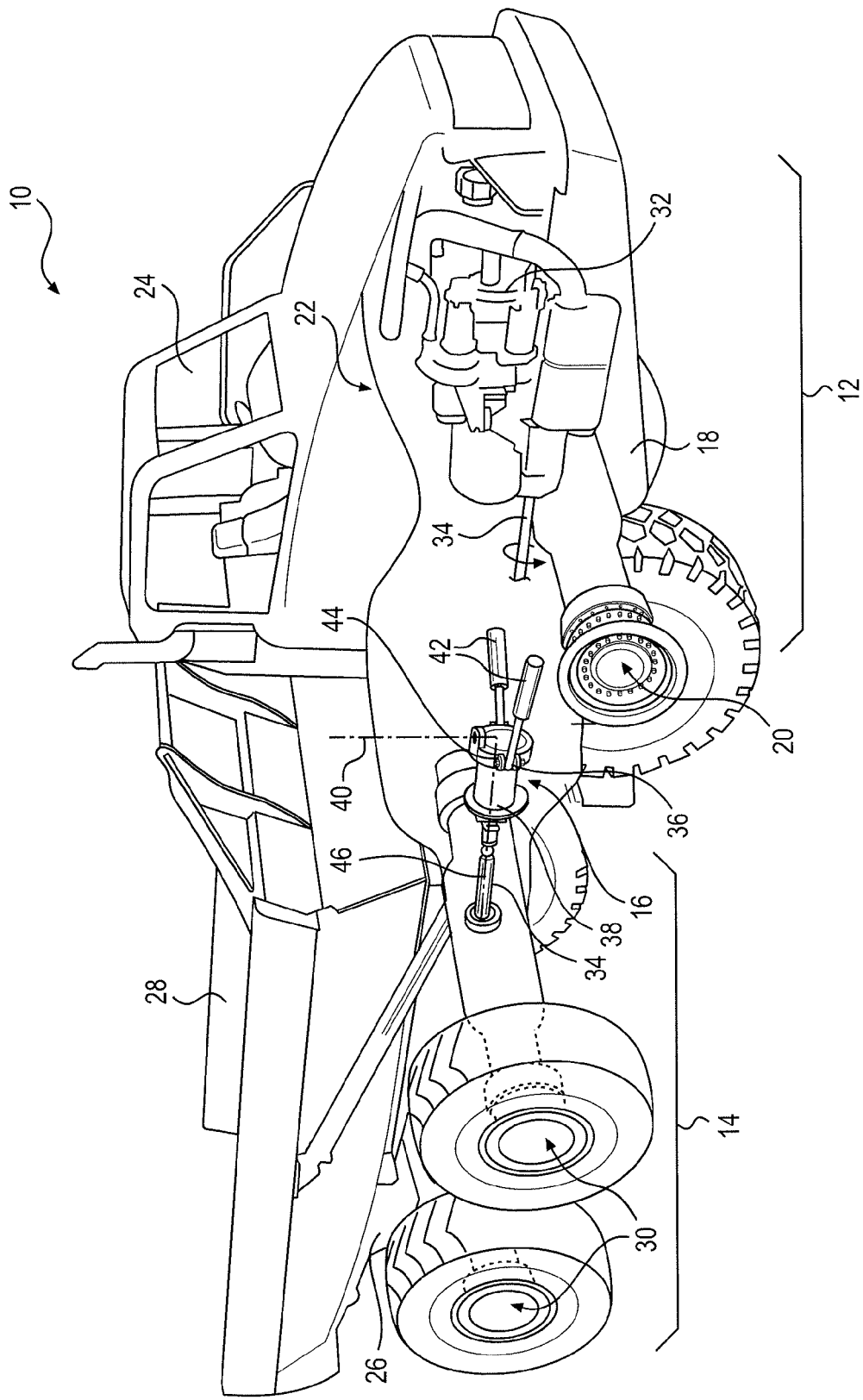
FIG. 1 is a pictorial illustration of a mobile machine having an exemplary disclosed hitch assembly.

FIG. 1 illustrates an exemplary mobile machine 10. Machine 10, in the disclosed example, is an earth-moving machine such as a haul truck that is configured to be loaded with material at a first location, transport the material from the first location to a second location, and unload the material at the second location. It is contemplated, however, that machine 10 may embody another type of mobile machine, if desired, such as a scraper, a wheel loader, a motor grader, or another machine known in the art. Machine 10 may be an articulated machine having a front tractor 12 operatively connected to a rear trailer 14 by an articulation hitch assembly 16.

Front tractor 12 may include multiple components that interact to power and control operations of machine 10. Specifically, front tractor 12 may include a frame 18, a front axle assembly 20, a powertrain 22, and an operator station 24. Frame 18 may rotatably receive front axle assembly 20 and be configured to support powertrain 22. Powertrain 22 may be configured to drive front axle assembly 20 and provide electrical and/or hydraulic power to other components of machine 10. Operator station 24 may facilitate control of machine 10.

Rear trailer 14 may include a frame 26 that supports a work tool 28 at the back end of machine 10. In the disclosed example, work tool 28 is a dump bed that is vertically supported by one or more rear axle assemblies 30 such that work tool 28 may be raised and lowered relative to a ground surface. It should be noted, however, that other types of work tools 28 may alternatively be utilized in connection with machine 10 and/or that work tool 28 may be supported by front tractor 12, if desired. In some embodiments, rear axle assemblies 30 may also be driven by powertrain 22, for example via hitch assembly 16. In these embodiments, rear axle assembly 30 may be substantially identical to front axle assembly 20.

Powertrain 22 may include an engine 32, for example an internal combustion engine, that combusts fuel to produce a mechanical power output used to drive front and/or rear axle assemblies 20, 30 and to raise and lower work tool 28. A series of driveshafts 34 may extend from engine 32 directly to front axle assembly 20 and indirectly through hitch assembly 16 to rear axle assemblies 30, as will be described in more detail below.

Hitch assembly 16 may be an assembly of components that cooperate to connect rear trailer 14 to front tractor 12, while still allowing some relative rotational movements therebetween. In particular, hitch assembly 16 may include a yoke portion 36 and a tube portion 38 that is connected at one end to yoke portion 36. Yoke portion 36 may pivotally engage a complimentary yoke portion (not shown) that is rigidly connected to frame 18 of front tractor 12, such that yoke portion 36 may pivot about a generally vertical axis 40. One or more steering actuators (e.g., hydraulic cylinders) 42 may engage outwardly-extending arms 44 of yoke portion 36 to affect articulation of machine 10 by extension and retraction thereof. Tube portion 38 may slidingly engage frame 26 of rear trailer 14, such that tube portion 38 (and front tractor 12) may generally pivot about a horizontal axis 46 relative to rear trailer 14. Driveshafts 34 may be articulately connected end-to-end, such that pivoting of front tractor 12 relative to rear trailer 14 about vertical and horizontal axis 40, 46 does not significantly affect power transmission from engine 32 to rear axle assemblies 30.

Figure 2:
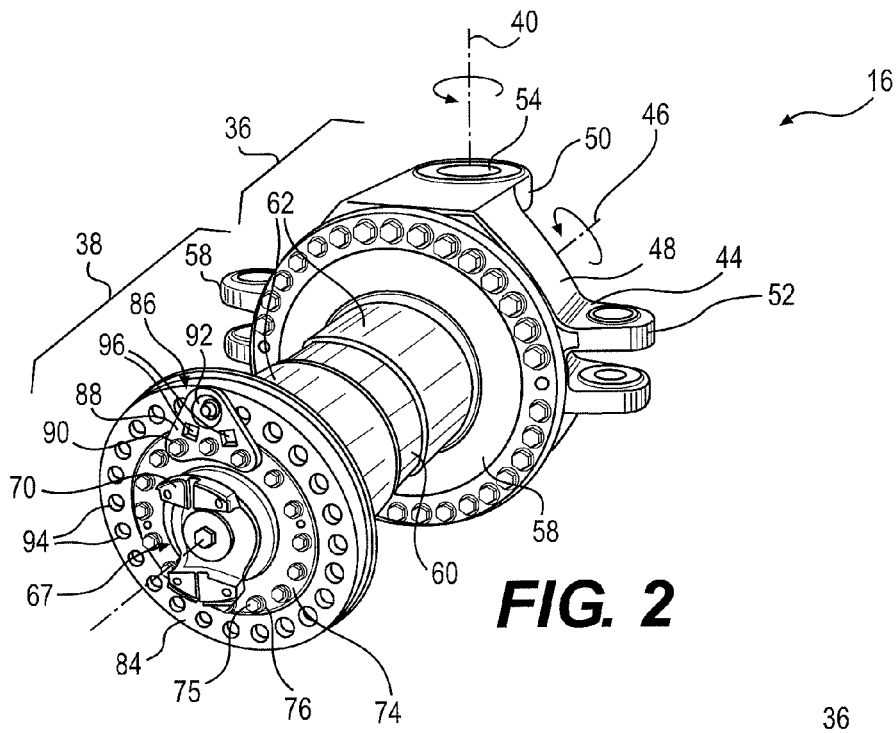
FIG. 2 is a pictorial illustration of the hitch assembly of FIG. 1.
Figure 3:
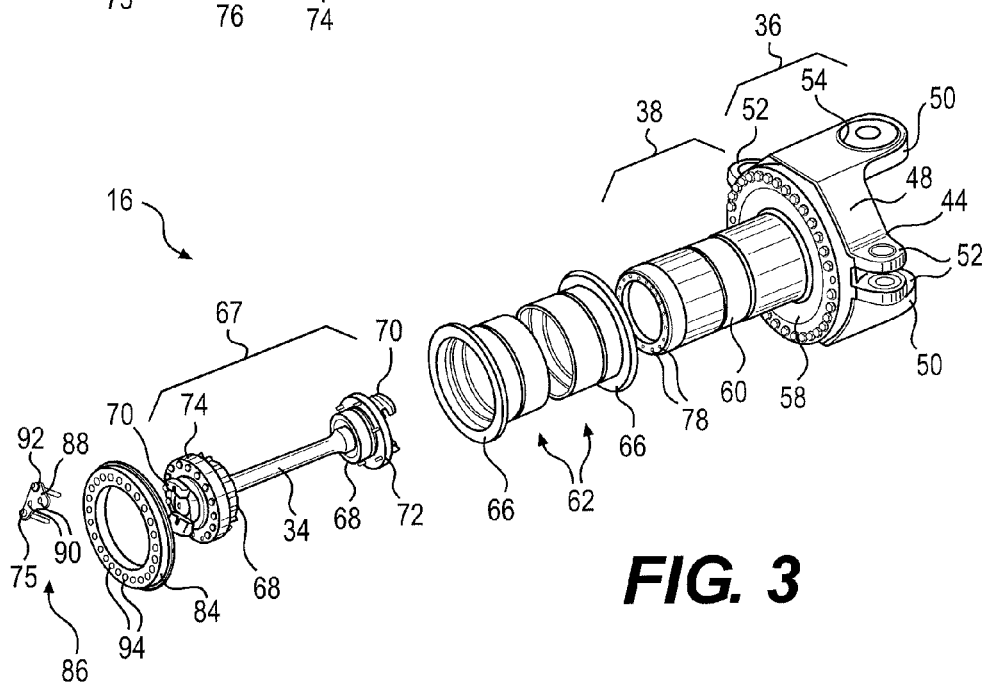
FIG. 3 is an exploded view pictorial illustration of the hitch assembly of FIG. 2.
Figure 4:
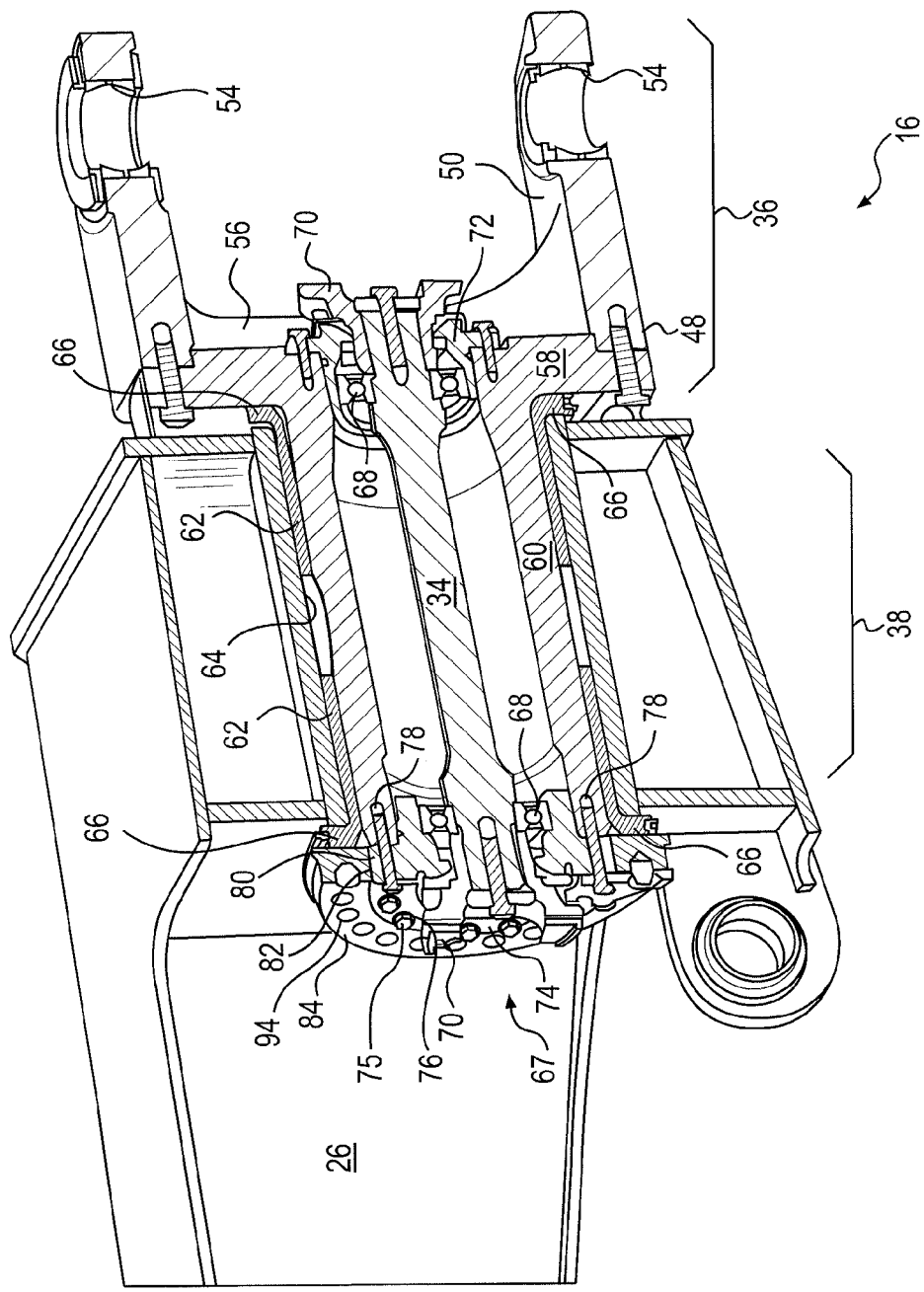
FIG. 4 is a cross-sectional illustration of the hitch assembly of FIGS. 2 and 3.

As shown in FIGS. 2-4, yoke portion 36 may include a ring-like base 48 having a first set of pivot brackets 50 generally aligned in a vertical direction along axis 40, and a second set of brackets 52 mounted at ends of arms 44. Brackets 50 may be spaced apart from each other to receive mating brackets (not shown) from the complimentary yoke portion of front tractor 12, and include large internal bores 54 lined with a bearing material (e.g., bronze, aluminum, polymer, etc.) to receive one or more pivot pins (not shown) of the complimentary yoke portion. In this manner, yoke portion 36 may be vertically supported by the complimentary yoke portion of front tractor 12, and configured to rotate about the pivot pins. Brackets 52 may be configured to similarly receive ends of steering actuators 42 (referring to FIG. 1), such that forces generated by steering actuators 42 may produce moments about vertical axis 40. A generally hollow center 56 (shown only in FIG. 4) of base 48 may provide clearance for one or more of driveshafts 34.

Tube portion 38 may include a base flange 58 and a generally hollow cylindrical protrusion 60 that is integral with and extends from base flange 58 in a direction opposite yoke portion 36. Base flange 58 may be connected to base 48 of yoke portion 36 at a side opposite brackets 50, for example by way of threaded fastening. One or more bearing members 62 may be located radially between protrusion 60 and frame 26 (see FIG. 4), allowing for hitch assembly 16 to rotate about axis 46 without generating significant wear of tube portion 38 or frame 26. In the disclosed embodiment, bearing members 62 may be received within a large cylindrical opening 64 of frame 26, and have integral lips 66 at opposing ends that help to cushion and protect against relative axial movements between hitch assembly 16 and frame 26.

As described above, a driveshaft 34 may be positioned within tube portion 38 (i.e., within the hollow center of protrusion 60). Driveshaft 34 may be part of a driveshaft assembly 67 that also includes bearings 68 located at opposing ends of driveshaft 34, pivot couplings 70 fixedly connected to the opposing ends of driveshaft 34, and leading and trailing hitch carriers 72, 74 configured to engage and support the ends of driveshaft 34.

Bearing 68 at the leading end of driveshaft 34 (i.e., at the end near yoke portion 36) may be disposed within leading hitch carrier 72, which may be bolted to an internal surface of base flange 58, and radially located between driveshaft 34 and an internal surface of protrusion 60. Bearing 68 at the trailing end of driveshaft 34 may be disposed within hitch carrier 74, which may be bolted to a distal end of protrusion 60, and radially located between driveshaft 34 and the internal surface of protrusion 60. Although shown as spherical roller bearings configured to support the rotation of driveshaft 34, it is contemplated that bearings 68 may be another type of bearing (e.g., tapered roller bearings) that also supports axial loading of driveshaft 34, if desired.

Pivot couplings 70 may each embody a universal joint type of coupling that is configured to allow rotation between driveshafts 34 whose axis are not always aligned. In general, each pivot coupling 70 may include a pair of hinges located close together, oriented generally perpendicular to each other, and connected by a cross shaft. Pivot couplings 70 may be connected to opposing ends of the drives shaft 34 that is located within hitch assembly 16, and configured to engage similar pivot couplings (not shown) that are mounted at ends of adjacent driveshafts 34.

Hitch carriers 72 and 74 may be configured to perform a number of different functions. First, hitch carriers 72 and 74 may have internal geometry that engages the internal surface of protrusion 60 and receives bearing 68. Second, hitch carriers 72 and 74 may include internal geometry that receives and/or seals against pivot couplings 70. Third, hitch carrier 74 may include end geometry that engages the distal end of protrusion 60 and accommodates fasteners 75 at an outer annular periphery that are used to connect hitch carrier to tube portion 38. In the disclosed embodiment, sixteen fasteners 75 are received within sixteen equally spaced holes 76 located around the outer annular periphery of hitch carrier 74. These fasteners 75 may pass through holes 76 to engage similarly spaced threaded bores 78 machined within the distal end of protrusion 60. Finally, hitch carrier 74 may include external threads 80 that are configured to engage internal threads 82 of a thrust collar 84. In the disclosed embodiment, buttress threading may be used to enhance resistance to high axial thrust loads at this interface. It is contemplated, however, that other thread geometries may alternatively be utilized, if desired.

Thrust collar 84 may be a generally ring-like member configured to surround hitch carrier 74 and axially place hitch carrier 74 at a desired location relative to frame 26, thereby preloading hitch assembly 16. In particular, by rotating thrust collar 84, the axial position of thrust collar 84 may change relative to the axial position of hitch carrier 74. For example, by rotating thrust collar 84 counterclockwise (relative to the perspective of FIG. 2), thrust collar 84 may move further away from yoke portion 36 relative to hitch carrier 74. Similarly, by rotating thrust collar 84 clockwise, thrust collar 84 may move closer to yoke portion 36. When thrust collar 84 moves closer to yoke portion 36, a distance between base flange 58 of tube portion 36 and thrust collar 84 may decrease. When hitch assembly 16 is first assembled and all components thereof are new (i.e., not significantly worn), a maximum distance may be established between base flange 58 and thrust collar 84. However, as lips 66 of bearing members 62 (and other co-located axial components) wear, hitch assembly 16 may become loose. Thrust collar 84, as will be described in more detail below, may be used to re-tighten the assembly by rotating thrust collar 84 clockwise and decreasing the distance between base flange 58 and thrust collar 84.

A locking plate 86 may be used to maintain a set distance between base flange 58 and thrust collar 84. Locking plate 86 may include a plate-like base member 88 having a plurality of holes 90 corresponding to fasteners 75, one or more pins, dowels, or other fasteners 92 in radial alignment with (i.e., spaced radially outward to align with a generally diametric location of) a plurality of locking holes 94, and a plurality of tool engagement features 96 located radially between holes 76 and pin 92. Base member 88, in the disclosed exemplary embodiment, may be generally triangular, with holes 90 located along a base edge, and pin 92 located at a tip opposite the base edge. Locking plate 86 may be held in place by fasteners 75 passing through each of holes 90 and clamping base member 88 to hitch carrier 74 and thrust collar 84, and by engagement of pin 92 with one of locking holes 94. In the disclosed embodiment, thrust collar 84 has about 50% more locking holes 94 than the number of holes 76 in hitch carrier 74. This ratio of holes 94 to holes 76 may allow for fine placement control of hitch carrier 74 relative to thrust collar 84. In particular, thrust collar 84 may be locked to hitch carrier 74 at about 15° increments. It is possible, however, that another ratio of locking holes 94 to holes 76 may alternatively be utilized, if desired.

Tool engagement features 96 may be openings of a particular shape (e.g., square openings) configured to receive a service tool having a corresponding shape. In the disclosed embodiment, two features 96 are included and located annularly in-between holes 90. This may allow the service tool to engage either opening for leveraging relative rotations of hitch carrier 74 in either the clockwise or counterclockwise direction, as will be described in more detail below.

INDUSTRIAL APPLICABILITY

The disclosed hitch assembly may be applicable to any articulated mobile machine where axial rigidity of the associated hitch is important. In particular, by providing a way for the articulated hitch to be adjusted after wear of the hitch has occurred, vibrational and shock loading in an axial direction of the hitch may be reduced. Adjustment of the disclosed articulated hitch will now be described in detail.

After a period of operation, bushing members 62 may wear, particularly lips 66 located axially at the ends of driveshaft assembly 67. If left unchecked, this wear can create axial spaces between base flange 58 and one end of the cylindrical portion of frame 26, and between thrust collar 84 and the opposing end of the cylindrical portion of frame 26. Then, as front tractor 12 accelerates or decelerates, a time lag will exist before rear tractor 14 follows suit and begins to accelerate and decelerate. This time lag could allow a speed difference to be generated between front tractor 12 and rear trailer 14, the speed difference causing a sudden jolt to occur that produces shock loading in hitch assembly 16. The shock loading, in addition to being uncomfortable for the operator of machine 10, can also cause damage to hitch assembly 16.

In order to increase the rigidity of hitch assembly 16 after wear has occurred and thereby decrease the severity and/or frequency of shock loading, a service technician may remove pin 92 from base member 88 and insert one end of the service tool into the appropriate engagement feature 96 (e.g., into the left-most engagement feature 96 when viewed from the perspective of FIG. 2). The service technician may then generate a counterclockwise moment on the service tool (i.e., pull down on a lever arm of the service tool that is extending to the left side of hitch assembly 16), causing thrust collar 84 to rotate in the counterclockwise direction. This rotation may result in driveshaft assembly 67 moving axially out of thrust collar 84 and causing thrust collar 84 to exert inward force toward base flange 58 of protrusion 60, thereby sandwiching lips 66 and decreasing the axial spaces described above. The service technician may continue to generate this counterclockwise moment until rotation of thrust collar 84 is no longer possible. At this point in time, the service technician may re-install pin 92 into the closest hole 94 of thrust collar 84. In some situations, it may be necessary to reverse rotation of thrust collar 84 until pin 92 annularly aligns with one of holes 94.

It should be noted that the counterclockwise moment described above may alternatively be created by positioning the service tool in the right-most engagement feature 96 and generating an upward force on the lever arm that is extending to the right side of hitch assembly 16, if desired. Similarly, to reverse direction of the moment, the force direction and/or the position of the lever arm may be reversed.

The disclosed hitch assembly may allow for fine control over axial rigidity adjustments. In particular, the number of holes 94 being 50% more than the number of holes 76 may allow for half-step adjustments, as compared to the situation where the number of holes are the same. This half-step adjustment may provide for 15° incremental adjustments, which may reduce shock loading, improve operator comfort, and improve component life.

The design of locking plate 86 may provide for increased strength of hitch assembly 16. In particular, by connecting to three different holes 76 via three different fasteners 75, an annular width of base member 88 at a junction between hitch carrier 74 and thrust collar 84 may be increased (as compared to a fewer number of holes 76). This increased width may increase a resistance of locking plate 86 to bending and shearing forces.

The disclosed hitch assembly may also be simple to adjust. Specifically, because only a single pin 92 needs to be removed from locking plate 86 and thrust collar 84 before the adjustment can be made, it may take little time and effort to accomplish the adjustment.

It will be apparent to those skilled in the art that various modifications and variations can be made to the disclosed hitch assembly without departing from the scope of the disclosure. Other embodiments of the hitch assembly will be apparent to those skilled in the art from consideration of the specification and practice of the hitch assembly disclosed herein. It is intended that the specification and examples be considered as exemplary only, with a true scope being indicated by the following claims and their equivalents.

What is claimed is:

1. A hitch assembly, comprising:
   a yoke portion;
   a tube portion extending from the yoke portion;
   a driveshaft;
   a hitch carrier located at a first end of the tube portion opposite the yoke portion and configured to rotationally support the driveshaft inside the tube portion, the hitch carrier having a plurality of first holes;
   a plurality of fasteners configured to connect the hitch carrier to the first end of the tube portion via the plurality of first holes;
   a thrust collar located at the first end of the tube portion and configured to threadingly engage an outer periphery of the hitch carrier, the thrust collar having a plurality of second holes; and
   a locking plate having at least one pin configured to engage at least one of the plurality of second holes, and a plurality of third holes configured to receive at least some of the plurality of fasteners,
   wherein a number of the plurality of second holes is greater than a number of the plurality of first holes.

2. The hitch assembly of claim 1, wherein the yoke portion includes a first set of brackets spaced apart to receive mating brackets of a front tractor yoke and pivot about a first axis defined by bores of the first set of brackets.

3. The hitch assembly of claim 2, wherein the tube portion is configured to be received within and pivot about a second axis of a rear tractor frame.

4. The hitch assembly of claim 3, wherein the first axis is substantially perpendicular to the second axis.

5. The hitch assembly of claim 2, further including a second set of brackets configured to receive at least one steering actuator.

6. The hitch assembly of claim 1, wherein:
the tube portion includes a base flange, and a cylindrical protrusion extending from the base flange; and
the thrust collar is connected to the cylindrical protrusion at a distal end opposite the base flange.

7. The hitch assembly of claim 6, wherein:
the hitch carrier is a first hitch carrier located at the distal end of the cylindrical protrusion; and
the hitch assembly further includes a second hitch carrier located within the base flange.

8. The hitch assembly of claim 7, wherein each of the first and second hitch carriers includes a bearing configured to rotationally support an end of the driveshaft.

9. The hitch assembly of claim 8, further including couplings at opposing ends of the driveshaft that are configured to pivotally connect the driveshaft to adjacent driveshafts.

10. The hitch assembly of claim 6, further including at least one bushing located radially outward of the cylindrical protrusion.

11. The hitch assembly of claim 10, wherein the at least one bushing includes two bushings located at opposing ends of the cylindrical protrusion.

12. The hitch assembly of claim 10, wherein the at least one bushing includes a lip formed around an axial end of the cylindrical protrusion.

13. The hitch assembly of claim 1, wherein:
the hitch carrier and thrust collar are connected by way of buttress threading; and
relative rotation of the hitch carrier and thrust collar adjusts rigidity of hitch assembly.

14. The hitch assembly of claim 13, wherein the including a locking plate rotationally locks the hitch carrier to the thrust collar.

15. The hitch assembly of claim 14, wherein:
the plurality of third holes are formed at a base edge of the locking plate; and
the locking plate further includes:
a generally triangular base plate in which the plurality of third holes are formed;
a single hole formed at a tip of the base plate opposite the base edge; and
at least one tool engagement feature located radially between the plurality of holes and the single hole.

16. The hitch assembly of claim 15, wherein the at least one tool engagement feature includes two tool engagement features, each of the two tool engagement features being located annularly in-between the plurality of third holes formed at the based edge.

17. The hitch assembly of claim 14, wherein the locking plate is configured to lock a rotational position of the thrust collar relative to a rotational position of the hitch carrier at about 15° increments.

18. A mobile machine, comprising:
a front tractor having a first frame;
a plurality of front traction devices rotationally supporting the first frame;
a rear trailer having a second frame;
a plurality of rear traction devices rotationally supporting the second frame;
an engine supported by the first frame and configured to drive the plurality of front and rear traction devices;
a hitch assembly pivotally connecting the rear trailer to the front tractor, the hitch assembly having:
a yoke portion configured to pivot relative to the front tractor about a first axis;
a bracket configured to receive at least one steering actuator that connects the first frame and the yoke portion;
a tube portion extending from the yoke portion and configured to pivot relative to the rear trailer about a second axis that is substantially perpendicular to the first axis;
at least one bushing located radially between the tube portion and the second frame;
a driveshaft connecting the engine to the rear traction devices and passing through the yoke portion and the tube portion;
first and second hitch carriers located at opposing ends of the tube portion and configured to rotationally support the driveshaft, the second hitch carrier having a plurality of first holes;
a plurality of fasteners configured to connect the second hitch carrier to the tube portion via the plurality of first holes;
a thrust collar configured to threadingly engage an outer periphery of the second hitch carrier and having a plurality of second holes; and
a locking plate having a single pin configured to engage at least one of the plurality of second holes, and a plurality of third holes configured to receive at least some of the plurality of fasteners,
wherein:
the plurality of second holes is greater than the plurality of first holes; and
the locking plate is configured to lock a rotational position of the thrust collar relative to a rotational position of the second hitch carrier at about 15° increments.

* * * * *